United States Patent [19]

Yamamoto et al.

[11] Patent Number: 4,806,780
[45] Date of Patent: Feb. 21, 1989

[54] IMAGE CORRECTION METHOD AND APPARATUS WITH PARTIAL DETECTOR ARRAY SAMPLING

[75] Inventors: Naofumi Yamamoto, Setagaya; Tutomu Saito; Hidekazu Sekizawa, both of Yokohama, all of Japan

[73] Assignee: Kabushiki Kaisha Toshiba, Kawasaki, Japan

[21] Appl. No.: 59,814

[22] Filed: Jun. 9, 1987

[30] Foreign Application Priority Data

Jun. 11, 1986 [JP] Japan .................................. 61-135238

[51] Int. Cl.⁴ ............................................... H01J 40/14
[52] U.S. Cl. ..................................... 250/578; 358/293
[58] Field of Search ...................... 358/213.15, 213.16, 358/293, 294; 250/208, 209, 214, 578

[56] References Cited

U.S. PATENT DOCUMENTS 4,567,529  1/1986  Yamaguchi et al. ................. 250/578
4,584,607  4/1986  Miyazawa .......................... 358/294

OTHER PUBLICATIONS

T. R. Little, "Real Time Digital Correction of Acquisition Errors Applied to Solid State Scanners", SPIE, Application of Digital Image Processing, vol. 119, pp. 172–181, 1977.

*Primary Examiner*—David C. Nelms
*Attorney, Agent, or Firm*—Foley & Lardner, Schwartz, Jeffery, Schwaab, Mack, Blumenthal & Evans

[57] ABSTRACT

A method and apparatus for performing a shading correction of image signals picked up by an optical detector array in which the period of x image signals can be prolonged by sampling of the image signal after reading reference signals and the speed of line memories can be reduced when carrying out an accumulative addition of picture elements, thereby enabling the use of low speed line memories.

7 Claims, 5 Drawing Sheets

IMAGE CORRECTION METHOD AND APPARATUS WITH PARTIAL DETECTOR ARRAY SAMPLING

BACKGROUND OF THE INVENTION

1. Field of the Invention

The present invention relates to image correction method and apparatus for performing a shading correction of image signals picked up by an optical detector array in a scanning unit for scanning and reading image on an original.

2. Description of the Prior Art

An apparatus for reading images using an one-dimensional optical detector array is disclosed in a second embodiment in Japanese Patent Application 59-192663 proposed by the same applicant as that of the subject application.

In this apparatus, two dimensional images are read by scanning the original line by line through scanning means including lens and an optical detector array in the vertical direction to the surface of the original, with one line on the original image focusing on the detector array through a lens system respectively and with the image thus focused being converted into successive electrical signals. The image signals thus obtained are shading-corrected after converting them into digital signals.

The shading correction of the object is carried out in order to correct dispersions of gain and offset in the direction of the scanning, which are caused by the dispersions of sensitivity of the optical detector array, dark current, fluctuations in illumination of a light source and to standardize the dispersions to values corresponding to reflection index of picture elements. More specifically, a black correction signal is subtracted from an image signal and the resulting signal is corrected by dividing it by a white correction signal.

The black and white correction signals are representative of gain and offset components of a read-out system for picture elements in each scanning direction and they are stored in two different line memories of a shading correction circuit. These signals are produced from the reference signals obtainable from the reading of black and white reference marks (plates) on the original by the detector array prior to the detection of the image on the original and they are stored as already described above. Consequently, any fluctuation in the gain and offset with time elapsed can be removed by reading the reference marks just before the reading-out of the original image.

However, when any error occurs in a correction signal, a streak-like noise parallel to the vertical scanning line is added to the image signals, which will result in the degradation in the quality of image. For this reason, unless the correction signal is sufficiently lower than the image signal, a detrimental effect will come out due to the correction. On the other hand, there is a tendency that noise sometimes enters into a signal read from the reference marks due to contamination of the reference marks as well as noise in an analog system.

In order to reduce this kind of noise in the correction signal, the correction is carried out by reading the reference marks several times and then by averaging the reference signals detected plural times for each picture element. This averaging function is carried out by line memories and adders. Namely, all of the contents of the picture elements in the line memories are first cleared and then each of the picture elements of the reference signals read from the reference marks is added to the content of each of the picture elements in the line memories and it is written into the same picture elements in the line memories.

Since the total of the picture elements of the reference marks thus added plural times is stored into the line memories, it is then divided by the number of read times, thus obtaining an averaged signal. In this case, taking the number of read times as the power of 2 permits the division to be carried out only by a bit shift.

As one problem of the shading correction circuit, such as the one described above according to the prior art, the operating speed of the line memories when reading the reference signals can be enumerated. When the image signal is corrected, only access to addresses of the line memories as well as reading data is performed during one cycle of the image signal. However, when the reading of the reference signals is performed, various operations, such as access to a memory address of the line memories, the reading of data, addition and writing of the data have to be carried out during one cycle of the image signal, a high speed function of the line memories is required.

On the other hand, the number of picture elements in one line is normally a order of 1,000 to 10,000 picture elements, so that high speed memories having a large capacity respectively are required. It may be possible to realize this kind of the line memories using the nowday techniques. However, the use of the high speed line memories having a large memory capacity will result in the increase in consumption power, the increase in manufacturing costs and degradation in reliability. In addition, the circuit efficiency is not good as it operates at high speed, only when reading the reference signals.

SUMMARY OF THE INVENTION

It is therefore an object of the present invention to provide a method and apparatus for performing a shading correction of image signals picked up by an optical detector array in which the period of image signal can be prolonged by sampling the memory signal reference when reading reference signals and the speed of line memories can be reduced when carrying out an accumulative addition of the picture elements, thereby enabling the use of low speed line memories.

One feature of the present invention resides in an image correction method which comprises the steps of: reading black and white reference mark plates so as to obtain black and white reference signals; calculating black and white reference signals plural times; sampling n picture elements out of every p picture elements (p>n) with respect to, e.g., black reference signal; and correcting the brightness $x_i$ of the image at position i of the original through a shading correction circuit in accordance with the following equation;

$$x'_i = (y_i - b_i) \times (1/a_i)$$

where
  $y_i$ = image signal to be input to the shading correction circuit,
  $b_i$ = black correction signal,
  $a_i$ = white correction signal Another feature of the present invention resides in an image correction apparatus for performing a shading correction of image signals which comprises optical detector array means for detecting image on an original document by scanning said original document; converting means for converting image signals thus detected into corresponding digital signals; means for accumulatively adding the reference signals obtained from black and white reference mark plates with respect to picture elements; storing means for storing the result of the addition; and shading correction means for performing a shading correction on the digital image signals thus converted.

These and other objects, features and advantages of the invention will be better understood from the following detailed description of the invention with reference to the accompanying drawings.

DESCRIPTION OF THE PREFERRED EMBODIMENT

Figure 1:
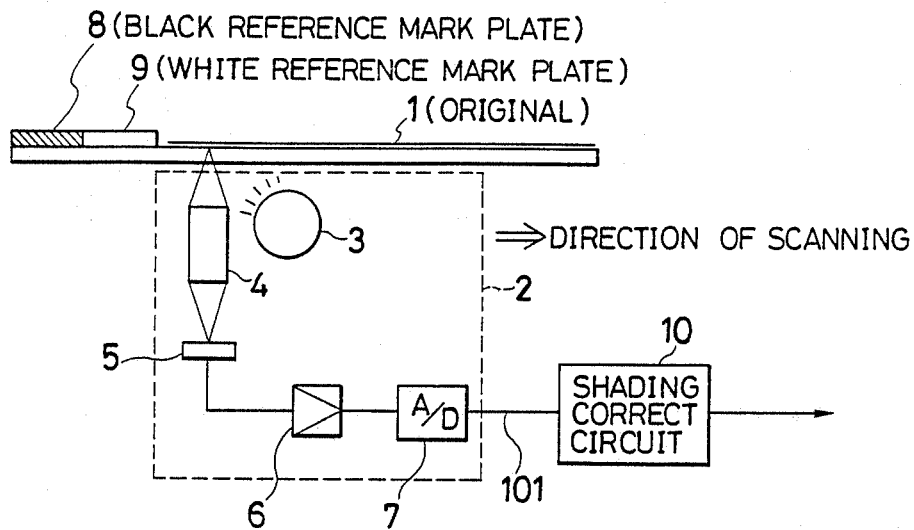
FIG. 1 is a general construction of the image correction apparatus of one embodiment according to the present invention.

Referring to FIG. 1, the image correction apparatus according to the present invention comprises a carriage including a light source 3, an cylindrical lens array 4, an optical detector array 5, an amplifier 6, and an A/D converter 7 and a shading correction circuit 10, the detailed construction of which will be described later, as well as an original document 1 to be scanned, which has black and white reference marks (plates) attached thereon. The optical detector array 5 is provided so as to detect the reflected light from the light source when scanning the original, in accordance with the movement of the carriage 2 in the transversal direction against the original.

In operation, the surface of the original 1 is illuminated by the light source 3 and the scanned area of one line on the original is projected on the optical detector array 5 through the lens array 4 and the image focused on the optical detector array 5 is detected by, for instance, CCD elements (charge coupled device elements) of the detector array as sequential time signals.

The signals thus detected are applied to the amplifier 6 and after amplification of the signals they are converted into digital signals 101 by the A/D converter 7. While scanning the original 1 by moving the carriage 2 in the lateral direction parallel to the surface of the original document 1, the image on the original is read from one line to another until the optical detector array 5 of the carriage 2 reads all of the information on the entire surface of the original 1. Then the analog signals thus scanned are converted into the digital signals 101 which are applied to the shading correction circuit 10 where a shading correction is performed.

The gain and offset of the image signals thus obtained have some dispersions due to the dispersions in the sensitivity of each of picture elements of the optical detector array 5, lack of uniformity in illumination by the light source, as well as dark current. Namely, supposing that the brightness of the scanning position n of the image on the original is $x_n$, the image signal $y_n$ thereof can be expressed as follows;

$$y_n = a_n x_n + b_n \qquad \ldots (1)$$

where $a_n$ and $b_n$ indicate respectively the amount of gain and offset components of each picture element of the system, as black and white correction signals.

In order to correct these dispersions, standardization of the image signals is carried out in the shading correction circuit 10, which performs the following functions;

(a) before reading the image on the original 1, it preliminarily reads out plural lines on the black and white reference marks provided at the end of the original and produces the corresponding black and white reference signals. The black reference signal is added plural times for every equal picture element and the corresponding signal is subtracted from the white reference signal and the corresponding signal is produced and the latter signal is added plural times for every equal picture element, and the resulting signal as well as the former signal is stored into the line memories (the detailed of which will be explained later) as the black correction signal $b_n$ and the white correction signal $a_n$, respectively.

(b) when reading the image on the original, the image signal obtained is subtracted by the black correction signal which has been stored in the line memory and the resulting signal is multiplied by a reciprocal of the white correction signal. In this case, the former function is called "read mode" and the latter is called "correction mode".

In the read mode, it is for the reduction in noise of the correction signals that any reference signal is accumulatively added to each of the picture elements. That is, if noise is added to the correction signal, a streak-like noise is generated in the image signal thus corrected, which is parallel to the lateral scanning direction, thereby extremely degrading the quality of the produced images. Accordingly, a sufficient high S/N ratio of the correction signal than that of the image signal is required. As a result, it is essential to perform the adding operation in an image read-out system, which does not have a sufficiently high S/N ratio.

Now, when accumulatively adding the image signals of plural lines, for every picture element, there are four functions to be carried out with respect to one picture element in any of the reference signals;

(i) access to an address of the line memory,
(ii) reading the content of the line memory,
(iii) addition of the content of the line memory to any reference signal, and
(iv) writing the result into the line memory.

On the other hand, there are two functions to be carried out in the correction mode;

(i') access to an address of the line memory, and
(ii') reading-out of the content of the line memory.

The processing time of the former becomes large compared with that of the latter.

Figure 2:
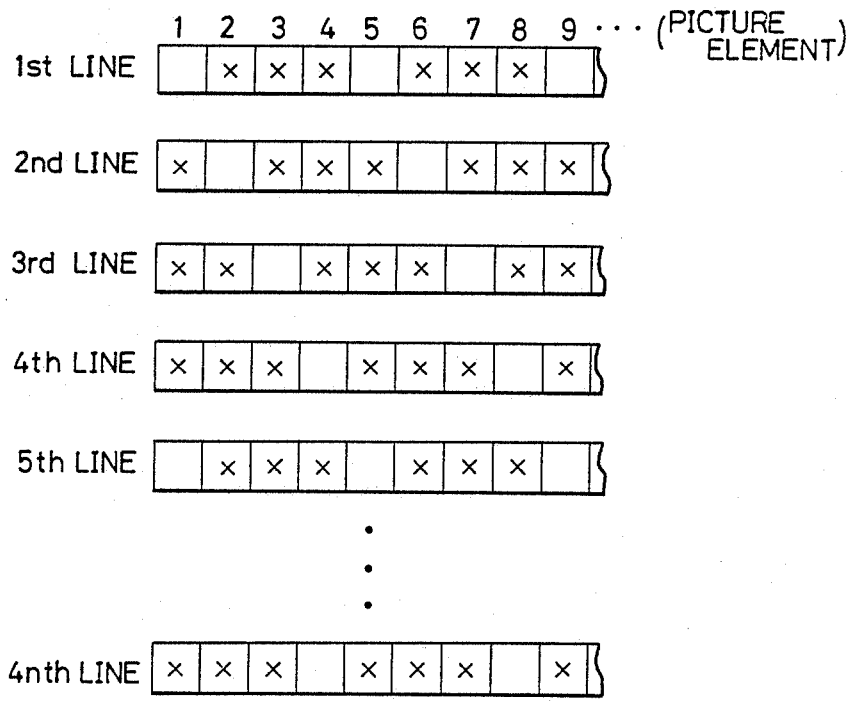
FIG. 2 illustrates a process of the sampling of picture elements for each of successive lines, according to the present invention.

FIG. 2 shows how the accumulative addition is performed in the shading correction circuit 10 according to the present invention, wherein the reference signal in the read mode is sampled every four picture elements and the accumulative addition is carried out by reducing the frequency of the signal into a ¼ frequency while the number of lines to be read about the reference signal is increased four times by successively changing the phase of the picture elements to be sampled per every one line. In FIG. 2, the crisscross mark (x) shows the picture elements not to be sampled. Namely, the first line is sampled at (4i + 1)th picture element (i.e., 1, 5, 9 ...), the second line is sampled at (4i+2)th element (i.e., 2, 6, 10 . . . ) and so forth, and fifth line is sampled at (4i+1)th element and this process is repeated by 4n lines. Accordingly, the accumulative addition is performed for n times about all of the picture elements.

Figure 3:
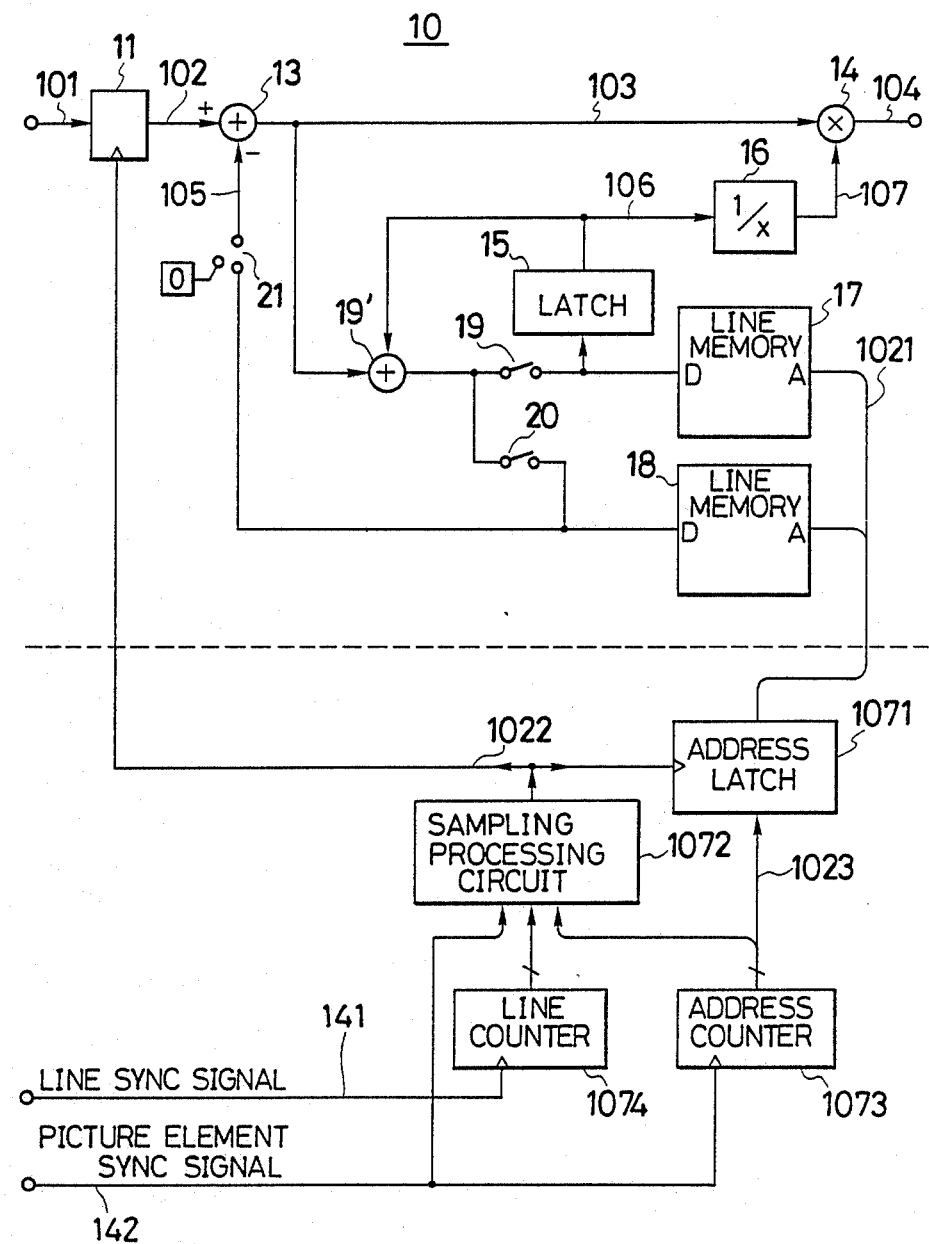
FIG. 3 is a detailed construction of a shading correction circuit as one embodiment of FIG. 1, according to the present invention.

FIG. 3 shows a detailed construction of the shading correction circuit 10. The digitalized image signal 101 from the A/D converter 7 of FIG. 1 is applied to the shading correction circuit 10 in synchronization with a clock signal 141 and it is latched in a latch circuit 11 consisting of registers not shown. The timing of the latch circuit 11 is determined in accordance with a clock signal 1022 described follow in the correction mode.

The image signal 102 which was shaped in the latch circuit 11 is subtracted by the black correction signal 105 in a subtracter 13 and the resulting signal 103 is multiplied by a reciprocal signal 107 of the white correction signal 106 in a multiplier 14, thus obtaining a corrected image signal 104.

The black correction signal 105 and the white correction signal 106 are indicative of $b_n$ and $a_n$, which have been stored in the line memories 17 and 18. The output from an address counter 1073 is supplied to the address line 151 of the line memories 17 and 18 through a address latch 1071 in the correction mode.

Since the address counter 1073 counts the clock signal 141, the corresponding black and white correction signals are read out of the line memories 17 and 18 synchronized with the image signal. Furthermore, in the correction mode, the selector 21 is always selecting the output of the line memory 18. A reciprocal table 16 is formed by a ROM and the reciprocal of the white correction signal 106 is produced as a signal 107.

The following operation is carried out with respect to the image signal $y_i$ to be applied to the shading correction circuit 10 and the dispersions of the offset and gain are corrected in the scanning direction;

$$x'_i = (y_i - b_i) \times (1/a_i)$$

As a result, the corrected image signal corresponding to the brightness of the image on the original 1 can be obtained, irrespective of the scanning positions.

The read mode is performed as follows; the carriage 2 is moved to the position where the black reference mark 8 is located at the end of the original before starting to read the image on the original 1 and the image is detected by the optical detection array 5, with the light source in the turned-off condition and the detected signal is amplified by the amplifier 6 and it is converted into a digital signal by the A/D converter 7. This signal is the black reference signal.

The reflection index of the black reference mark 8 is made almost zero or it is made sufficiently small. Since the optical detector array 5 detects signals, with no illuminated condition, the black reference signal includes the dark current of the read-out system including the amplifier 6 and it is representative of $b_n$. In this embodiment, the black reference mark 8 is read without turning on the light source 3. However, it may also be possible to read the mark 8, with the light source 3 turning on, or to read the black reference mark 8 having the reflection index of not zero without turning off, only if a condition such as that the amount of the light detected by the detector array 5 is zero or sufficiently small, is satisfied.

Since the reference signal is for correcting the image signal 101, it is necessary to read the reference signal at the same period as that of the image signal. The black reference signal 105 which has been applied to the shading correction circuit 10, is latched in the latch circuit 11.

In the read mode, the reference signal is sampled for every four picture elements and the accumulative addition is carried out by reducing the frequency of the signal into a ¼ frequency.

Namely, in this embodiment the sampling control is carried out by a sampling processing circuit 1072. A clock signal 1022 for performing the sampling of the picture elements is produced from the sampling processing circuit 1072. The timing of the sampling of a register 1051 and an address latch circuit 1071 is controlled by the clock signal 1022, which sample the reference signal 1001 and the output signal 1023 of an address counter 1073.

The address counter 1073 counts up in synchronization with a picture element synchronization signal, while the address counter output 1023 indicates the scanning position of the reference signal. Accordingly, the scanning position of the remaining reference signal after sampling and the address signal 1021 always correspond each other.

Figure 4:
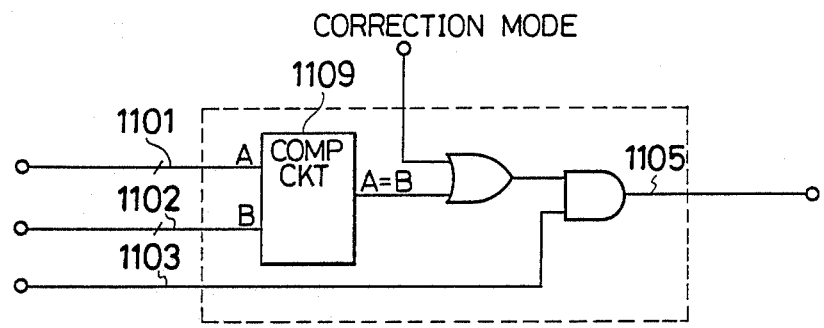
FIG. 4 is a circuit construction of a sampling processing circuit of first embodiment according to the present invention.

In the sampling processing circuit 1072 as shown in FIG. 4, the lower two bits 1101 of the address counter are compared with the lower two bits 1102 of the line counter in a comparing circuit 1104. When both data of bits are equal, the output of "1" is produced from the comparing circuit and the output of "1" is finally clocked with the clock signal in an AND circuit and is produced as a sampling clock 1105. The line counter 1102 is for carrying out the count-up of the line synchronization signal, which indicates the number of read-out lines. Accordingly, the lower two bits of the line counter become 00 in 4n th lines and a sampling clock is produced only when the lower two bits of the address counter become 00, i.e., 4m th picture element. Similarly, the sampling clock signal is produced at every (4n+1)th line, (4n+2)th, (4n+3)th line corresponding (4m+1), (4m+2)th, and (4m+3)th picture element respectively. Accordingly, all picture elements are read-out for 4-line read-out.

In the read mode of the black reference signal, as the subtraction input of the subtracter 13 is selected to "0" by the selector 21, the black reference signal which was sampled in the latch circuit 11 is directly applied to an adder 19 without being subtracted in the subtracter 13. Reference numeral 15 indicates to a latch circuit of the line memory 17. The accumulative addition is carried out about the black reference signals for plural lines per equal picture elements.

In this case, the contents of the line memory 17 have to be cleared before reading the black reference signal. When the black reference signal has been read-out, signals corresponding to the picture elements are read-out from the line memory 17 and the signals thus read out is latched in the latch circuit 15. After this operation, the content of the latch circuit 15 is added to the corresponding reference signal in the adder 19 and is then written into the same position of the line memory 17 again.

By reading out the black reference signal by 4n lines, a n-time accumulatively added signal is written into the line memory 17 for each of the picture elements of the black reference signal. In the present embodiment according to the present invention, the number n is selected as n=16 so that the line memory 17, the latch circuit 15 and the adder 19 are respectively formed of 12 bits to the image signal of 8 bits.

When reading the black reference signal, a gate 20 is turned on and the signal to be written into the line memory 17 is also written into the line memory 18 as well. As a result, an accumulatively added signal of the black reference signal is stored into the line memory 18. The accumulative added signal is then divided by 16 and signal thus averaged becomes the black reference signal 105. In this case, the division by 16 is realized by a shifting operation and the content of the line memory may be considered as representing the black reference signal 105 as it is.

Figure 5:
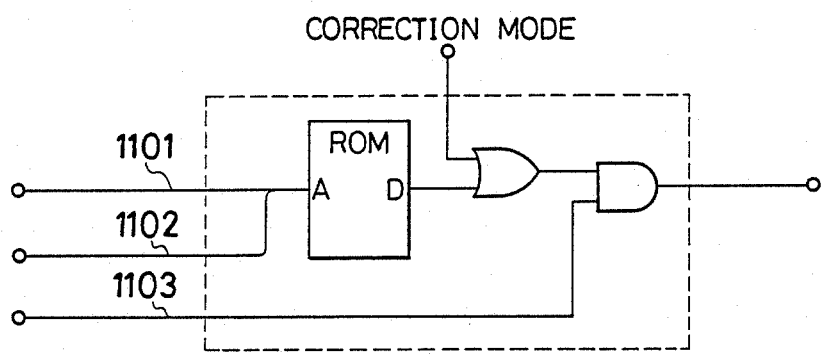
FIG. 5 is another embodiment of the sampling processing circuit according to the present invention.

In this embodiment, each of the lower two bits of the line counter and address counter are compared with each other, thereby producing the sampling clock. However, it may also be possible to produce the sampling clock by using a ROM shown in FIG. 5 at an arbitrary sequence. Namely, the output of the address counter and that of the line counter are applied to the ROM as its address and each sampling clock is produced in accordance with data output from the ROM. If certain conditions are satisfied in the production of the sampling clock in the same number of times with respect to each picture element and in the interval of the sampling clock in the accumulative addition, the sampling clock can be produced at an arbitrary sequence.

After the read operation of the black reference signal has been terminated, the carriage 2 is now moved to the position of the white reference mark 9, with the light source being turned on, the read-out operation of the white reference signal is performed in the same manner as that in the back reference signal. In this embodiment, a non-colored mark which is equivalent to a white paper having an uniform reflection index is used as the white reference mark 9. However, this is not necessarily requisite and when the white reference mark is not equivalent to a white paper in the reflection index or it is somewhat colored, the correction can be carried out by changing the content of the reciprocal number table 16 in that case.

The white reference signal is representative of the sum of the gain component $a_n$ and the offset component $b_n$ resulting from the dispersions in the sensitivity of each photo-sensitive element in the optical detector array 5 and the fluctuation in illumination of the light source 3. In this case, the reflection index of the white reference mark 9 is taken as 1.

The white reference signal is also applied to the shading correction circuit 10 and it is accumulatively added for each picture element. The processing of the white reference signal is almost same as that in the black reference signal, except for the following points. Namely, the subtraction input 105 of the subtracter 13 is firstly selected by the selector 21 so as to select the content of the line memory 18 and secondly, the gate 20 is turned off, so that the signal is not written into the line memory 18 in the accumulative addition. Consequently, the signal which is produced from the subtraction of the black reference signal from the white reference signal is accumulatively added, thereby resulting in the white correction signal which corresponds to $a_n$ described before.

When the read of the black and white reference signals has been terminated, the white and black correction signals of $a_n$ and $b_n$ are stored into the line memories 17 and 18. Accordingly, when reading the image on the original, a highly accurate correction of the image can be carried out by using the correction signal.

Figure 6:
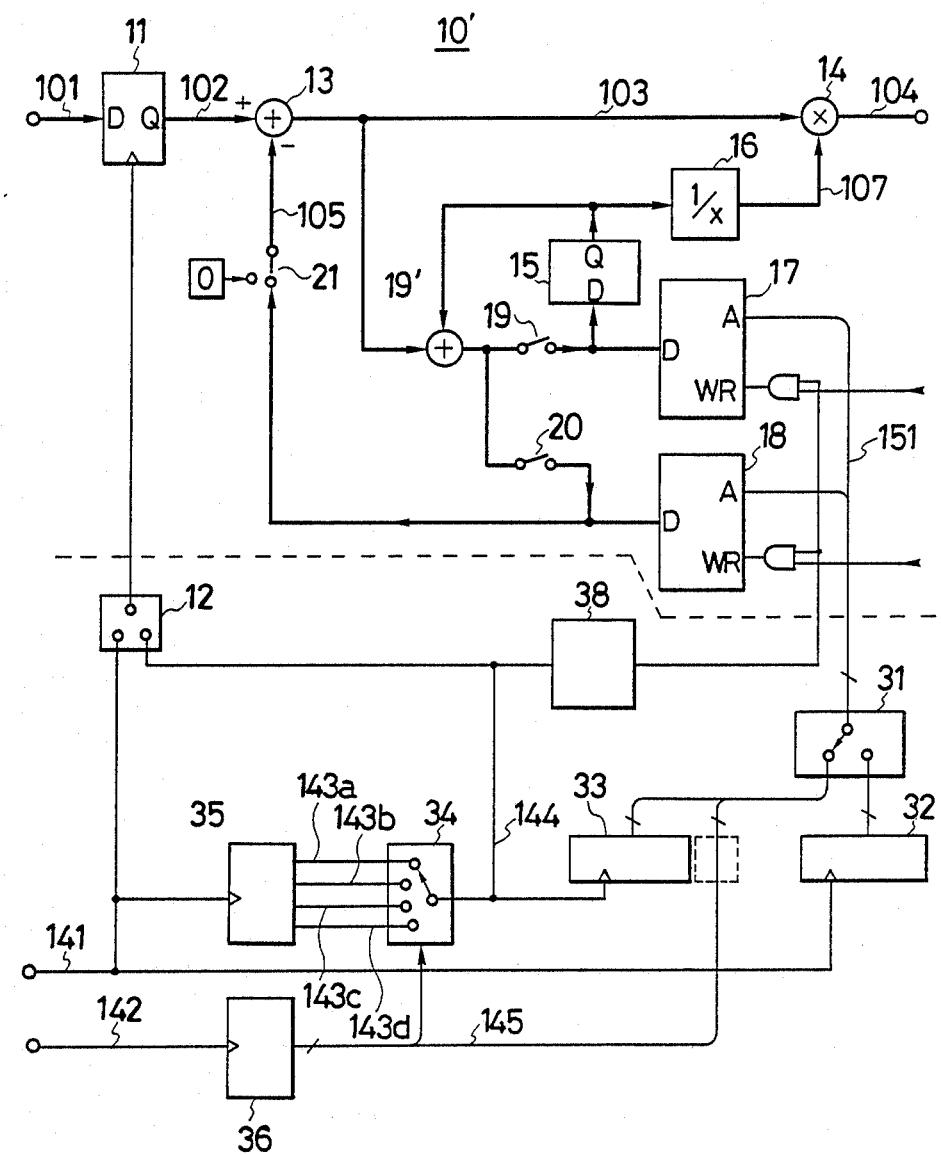
FIG. 6 is another embodiment of the image correction apparatus according to the present invention.

FIG. 6 shows a second embodiment of the image correction apparatus according to the present invention. In the image correction apparatus 10', the upper portion of the apparatus (above the dotted line) including means for performing an accumulative addition of the reference signals and means for performing an correction operation to the image signal is same that of the first embodiment shown in FIG. 3. The difference is only the lower portion indicated by the dotted line, which performs a sampling operation.

Figure 7:
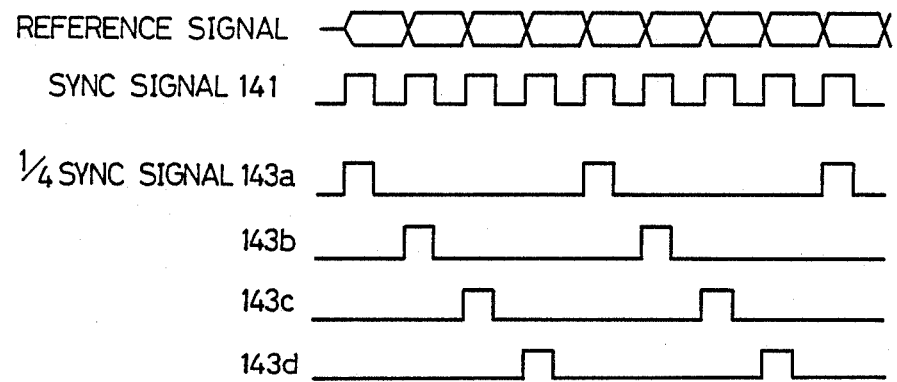
FIG. 7 is a timing chart of the operation of the shading correction circuit of FIG. 6.

In the read mode, the clock signal to be applied to the latch circuit 11 is selected by the selector 12 from either the clock signal 141 or a $\frac{1}{4}$ clock signal 144 of the clock 141 which is divided by a $\frac{1}{4}$ frequency divider 35 and is selected by a selector 34, as shown in FIG. 7. Each of the frequency-divided signals 143a to 143d is the signal sychronized with (4n+1)th picture element, (4n+2)th element, (4n+3)th element and (4n+4)th element, respectively (n>0). In this case, when the only signal 143a is for instance selected as the $\frac{1}{4}$ clock signal 144, only the black reference signal of (4n+1)th picture element is latched in the latch circuit 11.

In other words, every four picture elements are sampled. The selector 34 is changed-over for every one line, the phase of the picture element or the positions of the picture elements to be sampled is changed and all of the picture elements are detected after four lines are read.

In the read mode of the black reference signal, as the subtraction input of the subtracter 13 is selected to "0" by the selector 21, the black reference signal which was sampled in the latch circuit 11 is directly applied to an adder 19 without being subtracted in the subtracter 13. Reference numeral 15 indicates to a latch circuit of the line memory 17. The accumulative addition is carried out about the black reference signals for plural lines per equal picture elements.

In this case, the contents of the line memory 17 have to be cleared before reading the black reference signal. When the black reference signal has been read-out, signals corresponding to the picture elements are read-out from the line memory 17 and the signals thus read out is latched in the latch circuit 15. After this operation, the content of the latch circuit 15 is added to the corresponding reference signal in the adder 19 and is then written into the same position of the line memory 17 again.

In the read mode, the address signal 151 of the line memory 17 is selected in such a manner that the address signal indicative of the output of the address counter 33 with respect to the upper 11 bits and the phase of the picture elements to be read-out among the four picture elements with respect to the lower two bits are selected by the selector 31. The address counter 33 is counted up by one for every $\frac{1}{4}$ frequency divided clock signal 144, so that the picture elements in the positions corresponding to those of the black reference signal in the line memory 17 are processed. By reading out the black reference signal by 4n lines, a n-time accumulatively added signal is written into the line memory 17 for each of the picture elements of the black reference signal. In the present embodiment according to the present invention, the number n is selected as n=16 so that the line memory 17, the latch circuit 15 and the adder 19 are respectively formed of 12 bits to the image signal of 8 bits.

When reading the black reference signal, a gate 20 is turned on and the signal to be written into the line memory 17 is also written into the line memory 18 as well. As a result, an accumulatively added signal of the black reference signal is stored into the line memory 18. The accumulative added signal is then divided by 16 and signal thus averaged becomes the black reference signal 105. In this case, the division by 16 is realized by a shifting operation and the content of the line memory may be considered as representing the black reference signal 105 as it is.

In the foregoing embodiments according to the present invention, a picture element is sampled for every four picture elements. However, it is apparent that it is not limited to this number. It may also be possible that one picture element is sampled for every two picture elements, for every five picture elements, n picture elements for every p picture elements (p>n), etc.

In the foregoing embodiments the description has been made that the sampling operation is performed with a predetermined period. However, it is also possible to perform the sampling operation irregularly only if a condition is satisfied that each of the number of accumulative additions is equal for each picture element. For instance, if data of whether or not sampling is performed with respect to certain picture elements and line numbers and picture element numbers have been preliminarily stored in the ROM, the sampling operation can be performed in accordance with these data.

Figure 8:
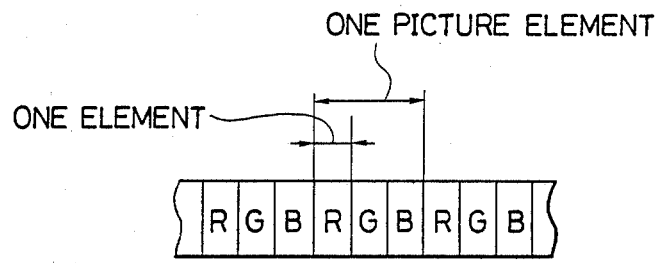
FIG. 8 is an arrangement of color filters of the image reading apparatus applied to a color image correction apparatus.

Moreover, it is also possible to apply the present invention to a color image input apparatus as shown in FIG. 8 having an optical detector array having three color elements or color filters of red (R), green (G), and blue (B) for each picture element and the same shading correction circuit according to the present invention can deal with the color images obtainable from a color image read-out system. In this case, if the color image signal has a same concentration in the picture element, the present invention is particularly effective as the frequency of the color image signal is three times higher than that of the black and white signals.

As described in the foregoing embodiments according to the present invention, the processing speed of the line memories the same speed of as that the correction mode, i.e., the period of the image signal by sampling the reference signals at the time of reading the reference signals in the shading correction circuit. As a result, the processing speed of the line memories can be increased even when low speed line memories are used for the correction, thereby lowering the manufacturing cost of the shading correction circuit and reducing the power consumption as well as achieving a high reliability.

While the invention has been described in its preferred embodiments, it is to be understood that the words which have been used are words of description rather than limitation and that various changes and modifications may be made within the purview of the appended claims without departing from the true scope and spirit of the invention in its broader aspects.

What is claimed is:

1. An image correction method which comprises the steps of:
   reading at least one reference mark plate so as to obtain at least one reference signal;
   sampling n picture elements out of every p picture elements (p>n) in the reference signal;
   calculating a correction signal by adding cumulatively the sampled n picture elements of the reference signal a plurality of times for every equal picture element; and
   correcting an image signal in accordance with the calculated correction signal.

2. The image correction method as claimed in claim 1, wherein the reference signal is a white reference signal $W_i$ obtained by reading a white reference mark plate, a white correction signal $a_i$ is calculated by adding cumulatively the sampled picture elements of the white reference signal $W_i$ a plurality of times for every equal picture element, and correcting an image signal $Y_i$ in accordance with the following equation:

$$X_i = Y_i \cdot (1/a_i)$$

where $X_i$ = corrected image signal.

3. The image correction method as claimed in claim 1, wherein the reference signals are a white reference signal $W_i$ obtained by reading a white reference mark plate and a black reference signal $B_i$ obtained by reading without light a black reference mark plate, a black correction signal $b_i$ being calculated by adding cumulatively the sampled picture elements of the black reference signal $B_i$ a plurality of times for every equal picture element, and calculating a white correction signal $a_i$ by subtracting the black correction signal $b_i$ from a signal obtained by adding cumulatively the sampled picture elements of the white reference signal $W_i$ a plurality of times for every equal picture element, an image signal $Y_i$ being corrected in accordance with the following equation:

$$X_i = (Y_i - b_i) \cdot (1/a_i)$$

$X_i$ = corrected image signal.

4. The image correction method as claimed in claim 2, wherein the position or positions of the picture elements to be sampled are shifted for each successive line when performing the cumulative addition step.

5. The image correction method as claimed in claim 4, wherein n picture elements and p picture elements are p=2 and n=1, p=4 and n=1, or p=5 and n=1.

6. An image correction apparatus for performing an shading correction of image signals, comprising:
   optical detector array means for detecting image signals on an original document of scanning said original document;
   converting means for converting image signals thus detected into corresponding digital signals;
   means for sampling n picture elements from every p picture elements (p>n) in the reference signals obtained from black an white reference marks;
   means for adding cumulatively the sampled picture elements of the reference signals a plurality of times for every picture element;
   storing means for storing the result from the adding means; and
   shading correction means for performing a shading correction on the converted digital image signals in accordance with the result of the addition.

7. The image correction apparatus as claimed in claim 6, wherein the reference signal is a white reference signal and is obtained by reading the white reference mark.

* * * * *